No. 671,969. Patented Apr. 16, 1901.
H. A. KNOX.
LUBRICATING DEVICE.
(Application filed Nov. 8, 1900.)
(No Model.)

Witnesses:
J. D. Garfield
K. I. Clemons

Inventor,
Harry A. Knox.
by Chapin &
Attorneys.

UNITED STATES PATENT OFFICE.

HARRY A. KNOX, OF SPRINGFIELD, MASSACHUSETTS.

LUBRICATING DEVICE.

SPECIFICATION forming part of Letters Patent No. 671,969, dated April 16, 1901.

Application filed November 8, 1900. Serial No. 35,855. (No model.)

*To all whom it may concern:*

Be it known that I, HARRY A. KNOX, a citizen of the United States of America, residing at Springfield, in the county of Hampden and State of Massachusetts, have invented new and useful Improvements in Lubricating Devices, of which the following is a specification.

This invention relates to the lubrication of bearings; and it has special reference to the lubrication of such machines as motors, the cranks and piston-rods of which run in closed casings and the cylinders of which are generally of the single-acting type with ends opening into said casings.

The object of the invention is to provide means for insuring the proper lubrication of the crank-bearings and the piston-rod bearings and to provide means whereby the oil which may enter said casing may be prevented from working back into the cylinder.

The invention consists in the various novel features of the above construction, as fully set forth in the following specification and the claims appended thereto.

Figure 1:
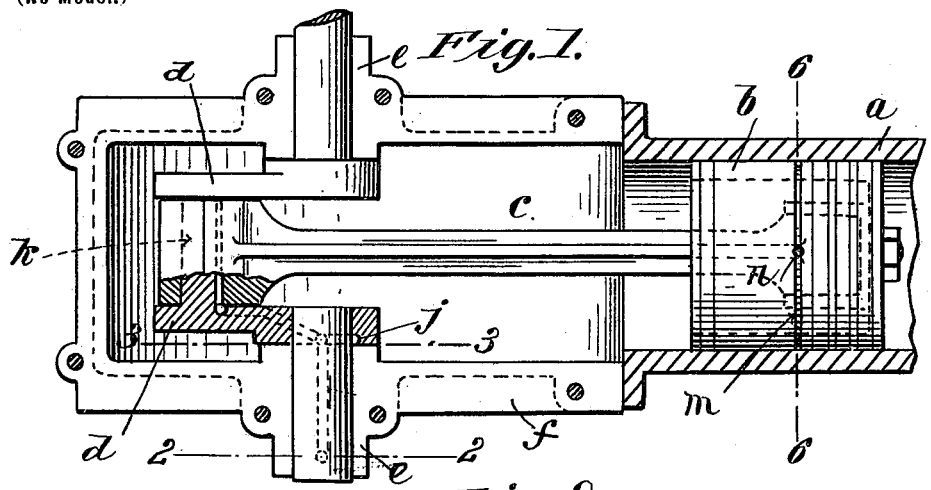
Figure 2:
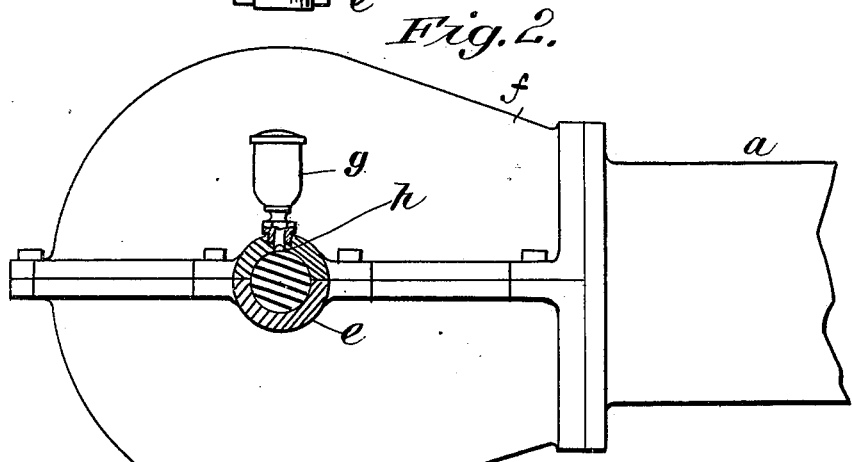
Figure 3:
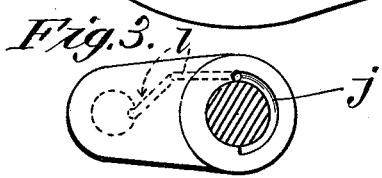
Figure 4:
Figure 5:
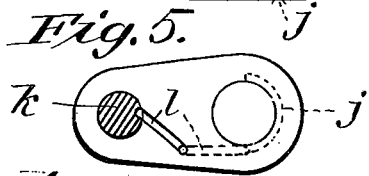
Figure 6:
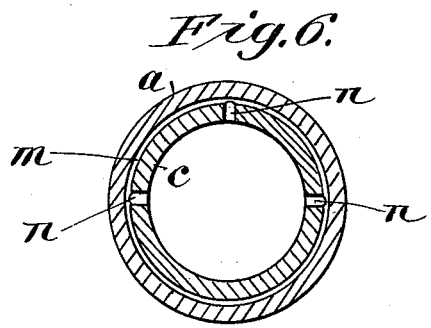

In the drawings forming part of this specification, Figure 1 represents on a longitudinal sectional line a part of the cylinder and the casing in which the crank and connecting-rod are inclosed embodying this invention, parts of the mechanism being broken away. Fig. 2 is a side elevation of said cylinder and casing, showing the end of the axle in section on line 2 2, Fig. 1. Fig. 3 is a side view of the crank of the motor, taken on line 3 3, Fig. 1. Fig. 4 is a top plan view of the same, and Fig. 5 a view of the side of the crank opposite to that shown in Fig. 3. Fig. 6 is a cross-sectional view of the piston and cylinder on line 6 6, Fig. 1.

Referring now to the drawings, $a$ is the cylinder of a motor. This cylinder is of the type common to the four-cycle type of internal-combustion engines, in which the forward end of the cylinder is open. The piston $b$ is cup-shaped, and a connecting-rod $c$ is pivotally connected therewith and extends forward to the crank $d$. The latter is supported in bearings $e$ and a casing $f$, which is bolted to a flange on the cylinder and which incloses said crank and connecting-rod. Said casing for convenience is divided longitudinally into two parts, as shown, whereby the lower part is adapted to retain oil that may drip from the bearings on the crank. The casing $f$ being practically sealed, the movements of the piston have the effect of creating more or less of a vacuum upon the stroke thereof toward the closed end of the cylinder. This reduction in pressure within the casing is employed, as will be described, for the purpose of assisting the flow of oil from cups outside of said casing to the several bearings on the crank-shaft. When the piston moves in the opposite direction, a reduction of pressure takes place behind the piston, which is employed to draw in and atomize liquid fuel on its passage to the cylinder. Incidental to this movement of the piston toward the open end of the cylinder the pressure in the casing $f$ will return substantially to normal. This change in pressure is utilized for effecting the more perfect lubrication of the crank and its bearings, as follows: It is obvious that the suction effect of the piston on the casing takes place upon the stroke of the piston toward the closed end of the cylinder—viz., away from the casing—from the position of the crank shown in Fig. 1 to a point opposite thereto. This suction effect is applied to the oil-cup $g$, Fig. 2, by providing a groove $h$ in the upper surface of one of the journal-boxes in said casing in which the crank runs. This groove runs from the hole through the journal into which the oil-cup is screwed inward to the edge of said journal, as shown in dotted lines in Fig. 1. In the side of the crank a groove $j$ is formed, which encircles one-half of said crank-bearing, one end of which groove terminates at the end of the groove $h$ and from thence runs around that half of the crank-bearing on the side thereof opposite to the wrist-pin $k$ of said crank. From the upper end of said semicircular groove $j$ a diagonal hole $l$ is drilled through the crank, which comes out on the inside thereof near the wrist-pin and runs from thence to the wrist-pin and in the surface of the latter across it to the opposite crank-arm. For convenience of manufacture the said groove between the wrist-pin and the end of the diagonal hole $l$ is formed in the inner surface of the crank-arm and then covered by a thin plate. (Not shown in the drawings.) Now when the crank is given a half-revolution by the rearward movement of the piston from the position shown in Fig. 1 the suction effect incidental to that movement will cause the oil in the cup $g$ to flow through the aforesaid grooves to the wrist-pin, communication between the hole $l$ and the groove $h$ being maintained during this half-revolution by the semicircular groove $j$, some part of which is always opposite the end of said groove $h$ during said half-revolution. As soon as the lower end of the groove $j$ passes by the end of the groove $h$ communication with the oil-cup is interrupted, and this interruption takes place as the piston reaches the end of its rearward stroke, and upon the return stroke of the piston communication between said grooves remains cut off until the piston again reaches the position shown in Fig. 1.

To provide against the passage of the oil between the cylinder and piston to the rear of the latter, as described, an annular groove $m$ is turned in the outer surface of the piston, preferably at a point as near the foremost packing-ring as possible, and this groove is tapped at one or more points by holes $n$, through which the oil may drain back to the inside of the piston. As the oil reaches said groove $m$ it gradually fills it, and by making the holes $n$ of the proper diameter as much oil may be retained in the lower portion of the groove $m$ as will serve to properly lubricate the piston without permitting any of it to work through to the back side thereof. In this way said groove $m$ may serve as a sort of a reservoir of oil for the piston. Further effects of the variation of pressures at either side of the piston are observed in the fact that the oil as it accumulates in the lower half of the casing $f$ will be thrown by the crank in greater or less quantities against the piston and into the open end of the cylinder and from thence finds its way between the piston and cylinder to the rear of the latter, where its presence is made manifest by the smoke which is emitted from the exhaust-pipe of the engine and by the accompanying odor.

From the above description it is obvious that the suction effect to which the casing is subjected upon the movement of the piston away from it will be utilized to draw oil from the cup $g$ and into the grooves $h$ and $j$ in the crank-journals and wrist-pin of the crank, thus effecting their thorough lubrication, and by the means described the oil thrown against the open end of the piston by the revolution of the crank is prevented from working past the piston in any quantity larger than that which suffices for its thorough lubrication.

Having thus described my invention, what I claim, and desire to secure by Letters Patent of the United States, is—

1. In a motor of the class described, the combination with an open-end cylinder, and a crank-casing secured to said open end, of a crank having bearings in suitable journal-boxes in said casing; a source of oil-supply communicating with one of said journal-boxes, a groove in the inner surface of the latter in communication with said oil-supply, and extending through a suitable conduit to the wrist-pin of the crank, a piston connected with the latter, and means whereby the continuity of said groove and conduit shall be interrupted during a part of the revolution of said crank, substantially as described.

2. In a motor of the class described, the combination with an open-end cylinder, and a crank-casing secured to said open end adapted to contain oil for the lubrication of said piston, of a crank supported in said casing, a piston in the cylinder connected with said crank; a groove encircling said piston, and one or more holes in said groove in communication with said casing, substantially as described.

HARRY A. KNOX.

Witnesses:
WM. H. CHAPIN,
K. I. CLEMONS.